United States Patent
Hueber et al.

(10) Patent No.: US 10,461,811 B2
(45) Date of Patent: Oct. 29, 2019

(54) METHOD AND SYSTEM FOR AUTOMATIC POWER CONTROL (APC) IN A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 7 days.

(21) Appl. No.: 15/839,495

(22) Filed: Dec. 12, 2017

(65) Prior Publication Data

US 2019/0181915 A1 Jun. 13, 2019

(51) Int. Cl.
| | |
|---|---|
| *H04B 5/00* | (2006.01) |
| *H01Q 5/328* | (2015.01) |
| *H04Q 1/48* | (2006.01) |
| *H01Q 1/24* | (2006.01) |
| *H04W 4/80* | (2018.01) |

(52) U.S. Cl.
CPC .......... *H04B 5/0031* (2013.01); *H01Q 1/243* (2013.01); *H01Q 5/328* (2015.01); *H04Q 1/48* (2013.01); *H04W 4/80* (2018.02)

(58) Field of Classification Search
CPC ...... H04B 5/0031; H04W 4/80; H04W 4/008; H01Q 1/243; H01Q 5/328; H04Q 1/48
See application file for complete search history.

(56) References Cited

U.S. PATENT DOCUMENTS

| | | | | |
|---|---|---|---|---|
| 9,918,280 | B1* | 3/2018 | Hueber | H04B 5/0031 |
| 2005/0082371 | A1* | 4/2005 | Schmidt | G06K 7/10 |
| | | | | 235/462.45 |
| 2014/0304094 | A1* | 10/2014 | Reddy | G02B 6/0073 |
| | | | | 705/17 |
| 2016/0329755 | A1* | 11/2016 | Park | H02J 7/025 |
| 2017/0155429 | A1* | 6/2017 | Hung | H04B 5/0037 |

* cited by examiner

Primary Examiner — Lewis G West (57) ABSTRACT

Embodiments of methods and systems for automatic power control (APC) in a communications device that communicates via inductive coupling are described. In an embodiment, a method for APC in a communications device that communicates via inductive coupling involves obtaining multiple system parameters, determining an APC configuration of the communications device from the system parameters, and controlling a transmission configuration of the communications device based on the APC configuration. Other embodiments are also described.

19 Claims, 6 Drawing Sheets

| INPUTS | | OUTPUT | | | | |
|---|---|---|---|---|---|---|
| RSSI (CODE) | Tx CURRENT (ma) | SUPPLY REGULATOR Vout | BACK-OFF (mV) | MODULATION INDEX CONFIG | NumDrivers | Other Tx Mod |
| RSSI1 | CUR1 | TVDD1 | BACKOFF1 | MODINDEX1 | 2 | MOD1 |
| RSSI1 | CUR2 | TVDD1 | BACKOFF1 | MODINDEX2 | 2 | MOD1 |
| RSSI1 | CUR3 | TVDD1 | BACKOFF1 | MODINDEX3 | 2 | MOD1 |
| RSSI2 | CUR1 | TVDD1 | BACKOFF1 | MODINDEX1 | 2 | MOD1 |
| RSSI2 | CUR2 | TVDD2 | BACKOFF1 | MODINDEX2 | 2 | MOD2 |
| RSSI2 | CUR3 | TVDD2 | BACKOFF1 | MODINDEX3 | 2 | MOD2 |
| RSSI3 | CUR1 | TVDD2 | BACKOFF1 | MODINDEX2 | 2 | MOD2 |
| RSSI3 | CUR2 | TVDD2 | BACKOFF1 | MODINDEX3 | 2 | MOD2 |
| RSSI3 | CUR3 | TVDD2 | BACKOFF1 | MODINDEX4 | 2 | MOD2 |
| RSSI4 | CUR1 | TVDD2 | BACKOFF1 | MODINDEX5 | 2 | MOD2 |
| RSSI4 | CUR2 | TVDD2 | BACKOFF1 | MODINDEX6 | 2 | MOD2 |
| RSSI4 | CUR3 | TVDD3 | BACKOFF1 | MODINDEX7 | 2 | MOD2 |
| RSSI5 | CUR1 | TVDD3 | BACKOFF1 | MODINDEX8 | 2 | MOD2 |
| RSSI5 | CUR2 | TVDD3 | BACKOFF1 | MODINDEX9 | 2 | MOD2 |
| RSSI5 | CUR3 | TVDD3 | BACKOFF1 | MODINDEX10 | 2 | MOD2 |
| RSSI6 | CUR1 | TVDD3 | BACKOFF1 | MODINDEX11 | 2 | MOD2 |
| RSSI6 | CUR2 | TVDD3 | BACKOFF1 | MODINDEX12 | 2 | MOD2 |
| RSSI6 | CUR3 | TVDD3 | BACKOFF1 | MODINDEX13 | 2 | MOD2 |
| RSSI7 | CUR1 | TVDD4 | BACKOFF1 | MODINDEX14 | 2 | MOD2 |
| RSSI7 | CUR2 | TVDD4 | BACKOFF1 | MODINDEX15 | 2 | MOD2 |
| RSSI7 | CUR3 | TVDD4 | BACKOFF1 | MODINDEX16 | 2 | MOD2 |
| RSSI8 | CUR1 | TVDD4 | BACKOFF1 | MODINDEX17 | 1 | MOD2 |
| RSSI8 | CUR2 | TVDD4 | BACKOFF1 | MODINDEX18 | 1 | MOD2 |
| RSSI8 | CUR3 | TVDD4 | BACKOFF1 | MODINDEX19 | 1 | MOD2 |

FIG. 3

| INPUTS | | | OUTPUT | | | | |
|---|---|---|---|---|---|---|---|
| RSSI (CODE) | Tx CURRENT (ma) | DECOUPLING | SUPPLY REGULATOR Vout | BACK-OFF (mV) | MODULATION INDEX CONFIG | NumDrivers | Other Tx Mod |
| RSSI1 | CUR1 | DEC1 | TVDD1 | BACKOFF1 | MODINDEX1 | 2 | MOD1 |
| RSSI1 | CUR1 | DEC2 | TVDD1 | BACKOFF1 | MODINDEX1 | 2 | MOD1 |
| RSSI1 | CUR2 | DEC1 | TVDD1 | BACKOFF1 | MODINDEX1 | 2 | MOD1 |
| RSSI1 | CUR2 | DEC2 | TVDD1 | BACKOFF1 | MODINDEX2 | 2 | MOD1 |
| RSSI1 | CUR3 | DEC1 | TVDD2 | BACKOFF1 | MODINDEX2 | 2 | MOD2 |
| RSSI1 | CUR3 | DEC2 | TVDD2 | BACKOFF1 | MODINDEX2 | 2 | MOD2 |
| RSSI2 | CUR1 | DEC1 | TVDD2 | BACKOFF1 | MODINDEX2 | 2 | MOD2 |
| RSSI2 | CUR1 | DEC2 | TVDD2 | BACKOFF1 | MODINDEX2 | 2 | MOD2 |
| RSSI2 | CUR2 | DEC1 | TVDD2 | BACKOFF1 | MODINDEX2 | 2 | MOD2 |
| RSSI2 | CUR2 | DEC2 | TVDD2 | BACKOFF1 | MODINDEX2 | 2 | MOD2 |
| RSSI2 | CUR3 | DEC1 | TVDD2 | BACKOFF1 | MODINDEX2 | 2 | MOD2 |
| RSSI2 | CUR3 | DEC2 | TVDD3 | BACKOFF1 | MODINDEX2 | 2 | MOD2 |
| RSSI3 | CUR1 | DEC1 | TVDD3 | BACKOFF1 | MODINDEX2 | 2 | MOD2 |
| RSSI3 | CUR1 | DEC2 | TVDD3 | BACKOFF1 | MODINDEX2 | 2 | MOD2 |
| RSSI3 | CUR2 | DEC1 | TVDD3 | BACKOFF1 | MODINDEX2 | 2 | MOD2 |
| RSSI3 | CUR2 | DEC2 | TVDD3 | BACKOFF1 | MODINDEX2 | 2 | MOD2 |
| RSSI3 | CUR3 | DEC1 | TVDD3 | BACKOFF2 | MODINDEX2 | 2 | MOD2 |
| RSSI3 | CUR3 | DEC2 | TVDD3 | BACKOFF2 | MODINDEX2 | 2 | MOD2 |
| RSSI4 | CUR1 | DEC1 | TVDD4 | BACKOFF2 | MODINDEX2 | 2 | MOD2 |
| RSSI4 | CUR1 | DEC2 | TVDD4 | BACKOFF2 | MODINDEX2 | 2 | MOD2 |
| RSSI4 | CUR2 | DEC1 | TVDD4 | BACKOFF2 | MODINDEX2 | 1 | MOD2 |
| RSSI4 | CUR2 | DEC2 | TVDD4 | BACKOFF2 | MODINDEX2 | 1 | MOD2 |
| RSSI4 | CUR3 | DEC1 | TVDD4 | BACKOFF2 | MODINDEX2 | 1 | MOD2 |
| RSSI4 | CUR3 | DEC2 | TVDD4 | BACKOFF2 | MODINDEX2 | 1 | MOD2 |

METHOD AND SYSTEM FOR AUTOMATIC POWER CONTROL (APC) IN A COMMUNICATIONS DEVICE THAT COMMUNICATES VIA INDUCTIVE COUPLING

BACKGROUND

Communications devices can communicate with each other via inductive coupling. For example, near field communications (NFC) is a wireless technology based on radio frequency identification (RFID). NFC allows wireless connection between two devices in close proximity to each other to exchange data between the two devices. RFID transponder devices that utilize NFC typically can be configured for either passive load modulation (PLM) or active load modulation (ALM).

In a communications device that communicates via inductive coupling, automatic power control (APC) can be used to control the load modulation amplitude (LMA) in response to the field-strength of inductive coupling to fulfill specification requirements. However, in a typical APC approach, it may be difficult to determine a desired APC configuration of a communications device that communicates via inductive coupling.

SUMMARY

Embodiments of methods and systems for automatic power control (APC) in a communications device that communicates via inductive coupling are described. In an embodiment, a method for APC in a communications device that communicates via inductive coupling involves obtaining multiple system parameters, determining an APC configuration of the communications device from the system parameters, and controlling a transmission configuration of the communications device based on the APC configuration. Other embodiments are also described.

In an embodiment, the system parameters include at least two of a parameter indicating a field strength of inductive coupling, a parameter indicating a coupling condition or a decoupling condition of inductive coupling, a receiving characteristic of the communications device, a transmission characteristic of the communications device, an antenna characteristic of the communications device, a communications protocol configuration of the communications device, a retransmission configuration of the communications device, a phase configuration of the communications device, and a matching network characteristic of the communications device.

In an embodiment, the parameter indicating the field strength of inductive coupling includes a received signal strength indicator (RSSI) at the communications device.

In an embodiment, the transmission characteristic of the communications device includes a transmitter current at the communications device.

In an embodiment, the transmission configuration of the communications device includes at least one of information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device.

In an embodiment, determining the APC configuration of the communications device from the system parameters includes processing a first system parameter of the system parameters based on a second system parameter of the system parameters and determining the APC configuration of the communications device from the processed first system parameter.

In an embodiment, the first system parameter includes a received signal strength indicator (RSSI) at the communications device.

In an embodiment, the second system parameter includes a transmitter current at the communications device.

In an embodiment, determining the APC configuration of the communications device from the system parameters includes determining the APC configuration of the communications device from the system parameters based on a look up table.

In an embodiment, an APC unit for a communications device that communicates via inductive coupling includes a system parameter obtaining unit configured to obtain multiple system parameters, an APC configuration determination unit configured to determine an APC configuration of the communications device from the system parameters, and a transmission configuration control unit configured to control a transmission configuration of the communications device based on the APC configuration.

In an embodiment, the system parameters comprise at least two of a parameter indicating a field strength of inductive coupling, a parameter indicating a coupling condition or a decoupling condition of inductive coupling, a receiving characteristic of the communications device, a transmission characteristic of the communications device, an antenna characteristic of the communications device, a communications protocol configuration of the communications device, a retransmission configuration of the communications device, a phase configuration of the communications device, and a matching network characteristic of the communications device.

In an embodiment, the parameter indicating the field strength of inductive coupling includes a received signal strength indicator (RSSI) at the communications device.

In an embodiment, the transmission characteristic of the communications device includes a transmitter current at the communications device.

In an embodiment, the transmission configuration of the communications device includes at least one of information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device.

In an embodiment, the APC configuration determination unit is further configured to process a first system parameter of the system parameters based on a second system parameter of the system parameters and determine the APC configuration of the communications device from the processed first system parameter.

In an embodiment, the first system parameter includes a received signal strength indicator (RSSI) at the communications device.

In an embodiment, the second system parameter includes a transmitter current at the communications device.

In an embodiment, the APC configuration determination unit is further configured to determine the APC configuration of the communications device from the system parameters based on a look up table.

In an embodiment, a method for APC in a communications device that communicates via inductive coupling involves obtaining a received signal strength indicator (RSSI) and a transmitter current at the communications device, determining an APC configuration of the communications device from the RSSI and the transmitter current, and controlling a transmission configuration of the communications device based on the APC configuration, wherein the transmission configuration corresponds to a load modulation amplitude of the communications device.

In an embodiment, determining the APC configuration of the communications device from the RSSI and the transmitter current includes processing the RSSI based on the transmitter current and determining the APC configuration of the communications device from the processed RSSI.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
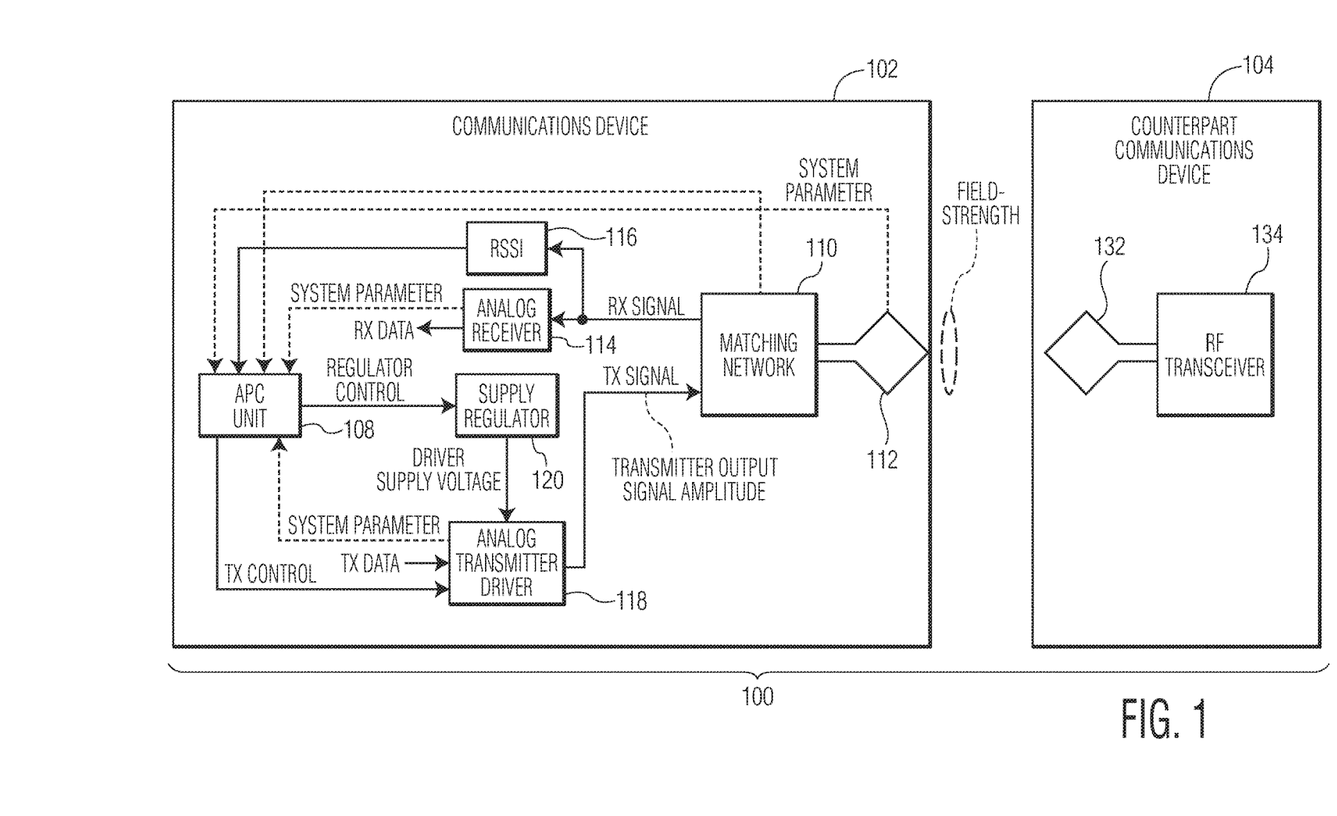
FIG. 1 depicts an embodiment of a communications device that can be used with a counterpart communications device to form an inductively coupled communications system.

FIG. 1 depicts an embodiment of a communications device 102 that can be used with a counterpart communications device 104 to form an inductively coupled communications system 100. In the inductively coupled communications system depicted in FIG. 1, the communications device 102 communicates with the counterpart communications device 104 via inductive coupling with a field strength, H. In some embodiments, the communications device 102 is a card/transponder device or the communications device 102 is in a "card-mode" in which the communications device 102 behaves as a card/transponder device and the counterpart communications device 104 is a dedicated reader device or a communications device in "reader-mode" in which the counterpart communications device 104 behaves as a reader device. In some other embodiments, the communications device 102 is a reader device or the communications device is in a reader mode and the counterpart communications device 104 is a dedicated card device or a communications device in card-mode.

In the embodiment depicted in FIG. 1, the communications device 102 includes an APC unit 108 configured to perform automatic power control for the communications device, a matching network 110 that is coupled to an antenna 112, an analog receiver "RX" 114, a received signal strength indicator (RSSI) unit 116, an analog transmitter "TX" driver 118, and a supply regulator 120. In an example operation of the communications device, an RF signal (e.g., an RX signal) is received by the antenna via inductive coupling from an antenna 132 of the counterpart communications device 104 and is passed to the analog receiver to convert the RF signal into a digital signal (e.g., RX data), which can be further processed by a digital processor. A signal (e.g., TX data) may be generated in response to the RF signal (e.g., by a digital processor) and is used to produce an outgoing RF signal (e.g., a TX signal) at the analog transmitter driver. The TX signal may be transmitted to the counterpart communications device via inductive coupling using the antenna 112. The antenna 112 may be an induction type antenna such as a loop antenna or any other suitable type of induction type antenna. The communications device 102 may be fully or partially implemented as an integrated circuit (IC) device. In some embodiments, the communications device 102 is a handheld computing system or a mobile computing system, such as a mobile phone, which includes all elements shown in FIG. 1. The communications device 102 may be a near field communications (NFC) device that utilizes inductive coupling to communicate. In some embodiments, the communications device 102 is implemented as an RF transponder that is compatible with the International Organization for Standardization (ISO)/the International Electrotechnical Commission (IEC) 14443 standard. Although the illustrated communications device 102 is shown with certain components and described with certain functionality herein, other embodiments of the communications device 102 may include fewer or more components to implement the same, less, or more functionality. For example, in some embodiments, the communications device includes a clock generation circuit that is used to generate a clock that is synchronous to the received clock and thus synchronous to the carrier sent out by the the counterpart communications device 104. In some embodiments, the communications device 102 is an active load modulation (ALM) device. In such embodiments, the communications device 102 can be configured to generate its own magnetic field for transmitting an outgoing RF signal using a current source, such as a battery, which results in greater communications distances compared to passive load modulation (PLM) systems.

In the embodiment depicted in FIG. 1, the counterpart communications device 104 includes the antenna 132 and an RF transceiver 134 configured to receive incoming RF signals from the antenna 132 and to transmit outgoing RF signals through the antenna 132. In some embodiments, the RF transceiver includes an analog receiver, a matching network, and/or an analog transmitter driver that are similar to or the same as the analog receiver 114, the matching network 110, and/or the analog transmitter driver 118 of the communications device 102.

The APC unit 108 of the communications device 102 is configured to perform automatic power control for the communications device. The APC unit may be implemented as hardware, software, firmware, and/or a combination of hardware, software, and/or firmware. In some embodiments, the APC unit is implemented as a processor such as a microcontroller or a central processing unit (CPU). In some embodiments, the APC unit is configured to control a transmission configuration of the communications device. For example, the APC unit can be used to control the load modulation amplitude (LMA) in response to the field-strength of inductive coupling to fulfill specification requirements (e.g., EVMCo, NFC Forum, or ISO/IEC14443 requirements). In an example operation of the APC unit, multiple system parameters are obtained, an APC configuration of the communications device is determined from these system parameters, and a transmission configuration of the communications device is controlled based on the APC configuration.

The APC unit 108 can perform automatic power control of the communications device in response to multiple different system parameters. Examples of system parameters that can be obtained by the system parameter obtaining unit may include, without being limited to, a parameter indicating a field strength of inductive coupling, a parameter indicating a coupling condition or a decoupling condition of inductive coupling, a receiving characteristic of the communications device, a transmission characteristic of the communications device, an antenna characteristic of the communications device, a communications protocol configuration of the communications device, a retransmission configuration of the communications device, a phase configuration of the communications device, and a matching network characteristic of the communications device. By performing automatic power control in response to multiple system parameters, the APC unit can perform automatic power control properly under various communications conditions between the communications device 102 and the counterpart communications device 104. Under two different communications conditions between the communications device 102 and the counterpart communications device 104, a particular system parameter may exhibit the same or a similar value. Thus, using a single system parameter may not uniquely determine an APC configuration for the communications device 102. For example, the field-strength of inductive coupling, which can be estimated as a received signal strength indicator (RSSI) value, when the communications device 102 is at a close distance (e.g., within 0.1 centimeter (cm)) from the counterpart communications device 104, may be identical to or similar to the field-strength of inductive coupling when the communications device 102 is at a farther distance (e.g., more than 3 cm) from the counterpart communications device 104. Consequently, an APC configuration for the communications device 102 may not be ideally determined solely based on the field-strength of inductive coupling. Compared to an APC element that determines an APC configuration for a communications device solely based on one system parameter, the APC unit 108 depicted in FIG. 1 determines a desired APC configuration for the communications device 102 based on more than one system parameter when the communications device 102 is at a close distance (e.g., within 0.1 cm) from the counterpart communications device 104. In addition, the APC unit 108 depicted in FIG. 1 can improve the accuracy of APC configuration when the communications device 102 is at a further distance from the counterpart communications device 104. Consequently, the overall inductive coupling based communications performance of the communications device can be improved.

In the embodiment depicted in FIG. 1, the RSSI unit 116 is configured to measure the signal amplitude of the received RF signal (RX signal) to generate a received signal strength indicator (RSSI) value. In some embodiments, the RSSI unit is a component of the APC unit 108. The supply regulator 120, which may be a low-dropout regulator (LDO) or other type of supply regulator (e.g., a DC-to-DC converter), is configured to generate a supply voltage for the analog transmitter driver.

Figure 2:
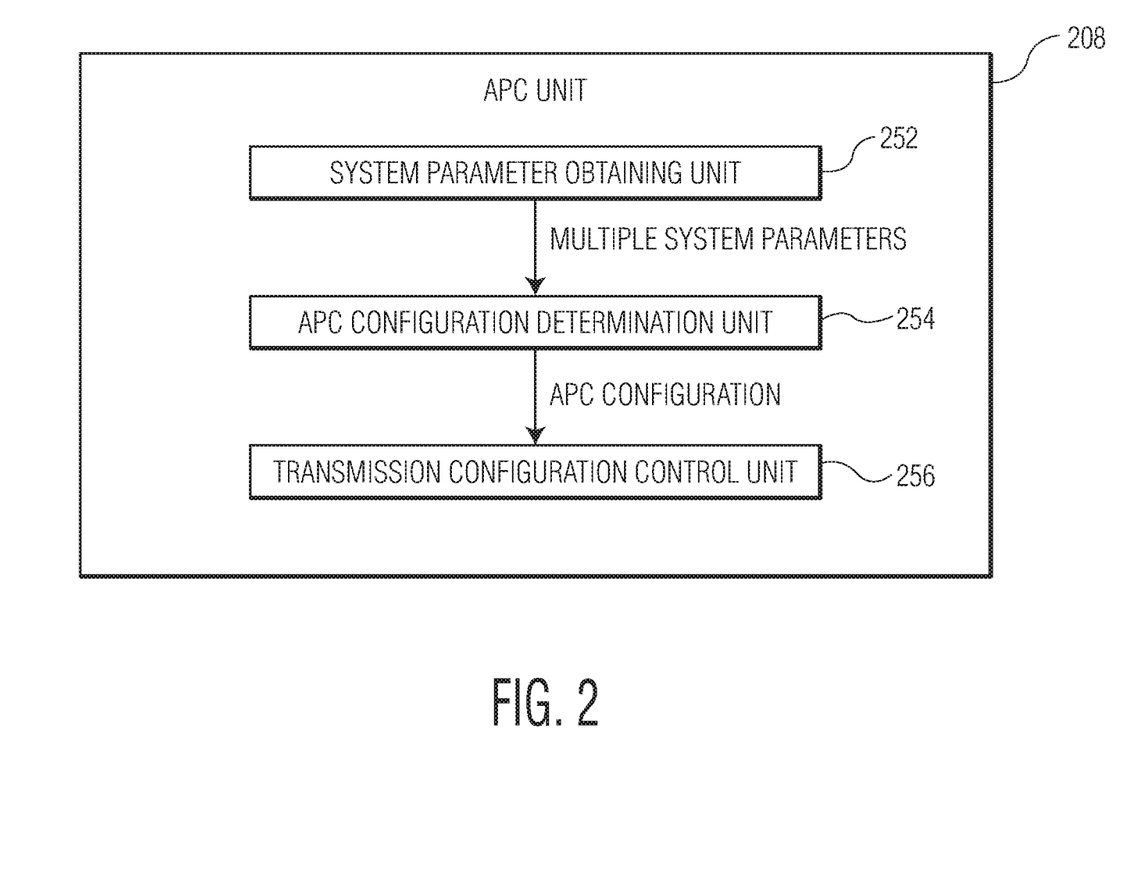
FIG. 2 depicts a functional block diagram of an embodiment of an APC unit of the communications device 102 depicted in FIG. 1.

FIG. 2 depicts a functional block diagram of an embodiment of the APC unit 108 of the communications device 102 depicted in FIG. 1. In the embodiment depicted in FIG. 2, an APC unit 208 includes a system parameter obtaining unit 252, an APC configuration determination unit 254, and a transmission configuration control unit 256. The APC unit 208 depicted in FIG. 2 is one possible embodiment of the APC unit 108 depicted in FIG. 1. However, the APC unit 108 depicted in FIG. 1 is not limited to the embodiment shown in FIG. 2. The APC unit may be implemented as hardware, software, firmware, and/or a combination of hardware, software, and/or firmware. In some embodiments, the APC unit is implemented as a processor such as a microcontroller or a central processing unit (CPU).

In the embodiment depicted in FIG. 2, the system parameter obtaining unit 252 is configured to obtain multiple system parameters. In some embodiments, the system parameter obtaining unit includes one or more sensors. For example, the system parameter obtaining unit may include a current sensor that is configured to sense current in the communications device (e.g., a transmitter current or a receiver current) and/or a voltage sensor that is configured to sense voltage in the communications device (e.g., a transmitter voltage, a receiver voltage, or an antenna voltage). In some embodiments, the system parameter obtaining unit includes one or more interface components for receiving multiple system parameters. For example, the system parameter obtaining unit may include an input terminal (e.g., an input pin) that is used to receive current in the communications device (e.g., a transmitter current or a receiver current) and/or to receive voltage in the communications device (e.g., a transmitter voltage, a receiver voltage, or an antenna voltage). Although the illustrated system parameter obtaining unit is shown as being separate from the APC configuration determination unit and the transmission configuration control unit at the functional block level, in some embodiments, the system parameter obtaining unit or some portion thereof is implemented within the APC configuration determination unit and/or the transmission configuration control unit.

Examples of system parameters that can be obtained by the system parameter obtaining unit 252 may include, without being limited to, a parameter indicating a field strength of inductive coupling, a parameter indicating a coupling condition or a decoupling condition of inductive coupling, a receiving characteristic of the communications device, a transmission characteristic of the communications device, an antenna characteristic of the communications device, a communications protocol configuration of the communications device, a retransmission configuration of the communications device, a phase configuration of the communications device, and a matching network characteristic of the communications device. In some embodiments, the field strength of inductive coupling between the communications device 102 and the counterpart communications device 104 is represented by a RSSI value, which can be generated by the RSSI unit 116 by measuring the signal amplitude of the received RF signal. In some embodiments, a coupling condition or a decoupling condition of inductive coupling indicates a communications performance of the communications device 102 with respect to the counterpart communications device 104. For example, the coupling condition or the decoupling condition can affect power transfer, shift characteristics (e.g., resonant frequency and Q-factor) of the matching network of the communications device, and the load of the analog transmitter driver 118 (shown in FIG. 1). The coupling condition or the decoupling condition of inductive coupling may include a receiver decoupling condition and/or a transmitter decoupling condition. In some embodiments, the transmitter decoupling condition is defined as a ratio between the actual transmitter impedance (with the counterpart communications device 104 in close proximity to the communications device 102) and the nominal transmitter impedance (without a corresponding communications device in close proximity to the communications device). The transmitter decoupling condition can be quantified by the control unit based on transmitter power (e.g., transmitter voltage and/or transmitter current) during a transmit operation. In some embodiments, the transmitter power information is assessed based on the transmitter voltage level. In some embodiments, the receiver decoupling condition is defined as a ratio of actual receiver gain (e.g., from reader source field to target receiver input) when the counterpart communications device is in close proximity to the communications device 102 versus a nominal receiver gain (e.g., from reader source field to target receiver input) when the counterpart communications device is not in close proximity to the communications device. In some embodiments, the receiving characteristic of the communications device includes a receiver current, a receiver voltage, a receiver impedance, and/or a receiver resonant frequency of the communications device. In some embodiments, the transmission characteristic of the communications device includes a transmitter current, a transmitter voltage, a transmitter impedance, and/or a transmitter resonant frequency of the communications device. In some embodiments, the antenna characteristic of the communications device includes an antenna voltage of the communications device and/or an antenna geometry of the communications device. In some embodiments, the communications protocol configuration of the communications device includes a protocol state of the communications device. In some embodiments, the retransmission configuration of the communications device includes a retransmission state of the communications device. In some embodiments, the phase configuration of the communications device includes the phase of a modulated signal relative to the carrier signal. In some embodiments, the matching network characteristic of the communications device includes the impedance configuration of the matching network. In some embodiments, the system parameters obtained by the system parameter obtaining unit 252 include a receiver gain parameter and a transmitter gain parameter. In an embodiment, the receiver gain parameter is a ratio between a received signal strength indicator (RSSI) at the communications device and a field strength of inductive coupling. In an embodiment, the transmitter gain parameter is a ratio between a load modulation amplitude of the communications device and a transmitter output signal amplitude of the communications device.

In the embodiment depicted in FIG. 2, the APC configuration determination unit 254 is configured to determine an APC configuration of the communications device from the multiple system parameters. The APC configuration determination unit may be implemented at least in part as a processor or a microcontroller. In the embodiment depicted in FIG. 2, the APC configuration is not mapped to a single system parameter. Instead of being an univariate function that is only dependent on a single system parameter, the APC configuration is a multivariate function that is dependent on multiple different system parameters. For example, the APC configuration may be a multivariate function of a RSSI value, which can be generated by the RSSI unit 116 by measuring the signal amplitude of the received RF signal, a decoupling condition of inductive coupling, and a transmitter current. In some embodiments, all of the system parameters that are used to determine the APC configuration of the communications device indicate instantaneous system conditions, which relate to an antenna condition, a distance between the communications device 102 and the counterpart communications device 104, or the field strength of inductive coupling. Consequently, various factors that can cause APC accuracy degradation are considered and the APC configuration can be determined more accurately.

In the embodiment depicted in FIG. 2, the APC configuration of the communications device 102 is a function of multiple different system parameters. In some embodiments, the APC configuration of the communications device is a function of a first system parameter that is processed or compensated based a second system parameter. In these embodiments, the APC configuration determination unit is configured to process a first system parameter based on a second system parameter and to determine the APC configuration of the communications device from the processed first system parameter. For example, a RSSI value, which can be generated by the RSSI unit 116 by measuring the signal amplitude of the received RF signal, can be processed or compensated for by another system parameter such as a transmitter current. In this example, the APC configuration of the communications device is a function of the processed/compensated RSSI value.

In some embodiments, multiple different possible APC configurations of the communications device are stored in an APC table. The APC configuration determination unit 254 is configured to determine the APC configuration of the communications device from the system parameters based on a look up table. The APC configuration determination unit may include an APC table storage, which can be implemented as read only memory (ROM), flash memory, random access memory (RAM), or cache of the communications device. The APC table may contain information reflecting a relationship between multiple system parameters and an LMA of the communications device. In some embodiments, the APC table contains multiple system parameters and information regarding a corresponding transmission configuration of the communications device.

In the embodiment depicted in FIG. 2, the transmission configuration control unit 256 is configured to control a transmission configuration of the communications device based on the determined APC configuration. The transmission configuration control unit may be implemented at least in part as a processor or a microcontroller. The transmission configuration of the communications device may include at least one of the following or a combination of the following: information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device. In some embodiments, the transmission configuration control unit controls the transmission configuration of the communications device by generating a transmitter control signal to control the analog transmitter driver 118 (shown in FIG. 1). For example, the transmission configuration control unit can control a modulation configuration (e.g., select a specific modulation scheme from a number of potential modulation schemes) in the analog transmitter driver. In another example, the transmission configuration control unit can control the analog transmitter driver to achieve or exceed a particular ratio between a maximum possible transmit power and an actual mean transmit power of the communications device. In another example, the transmission configuration control unit can adjust the number of transmitter drivers in the communications device (e.g., by enabling or disabling one or more analog transmitter drivers). In addition, the transmission configuration control unit may also control the supply regulator 120 to set a driver supply voltage for the analog transmitter driver based on the APC configuration.

Figure 3:
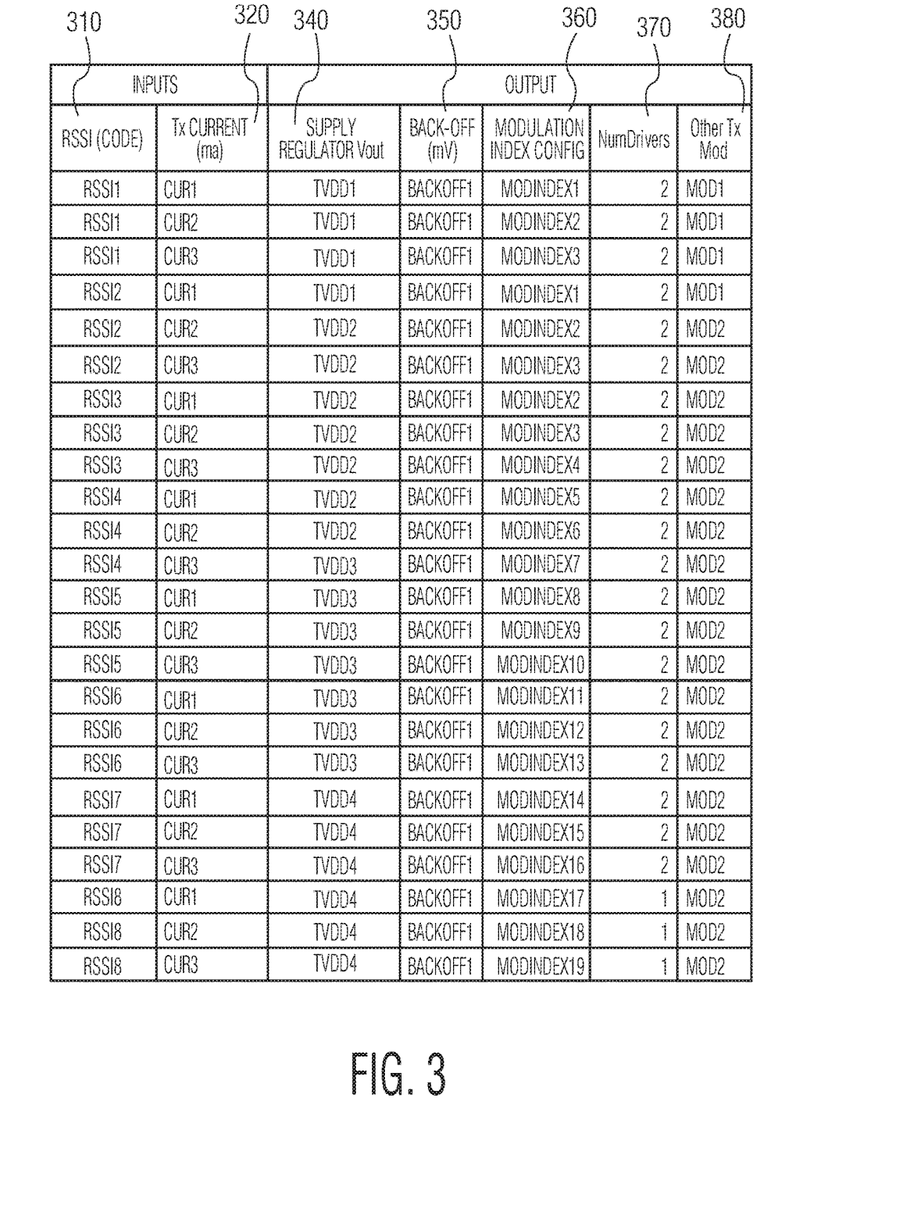
FIG. 3 illustrates an APC look up table that can be used by the APC unit depicted in FIG. 2.
Figure 4:
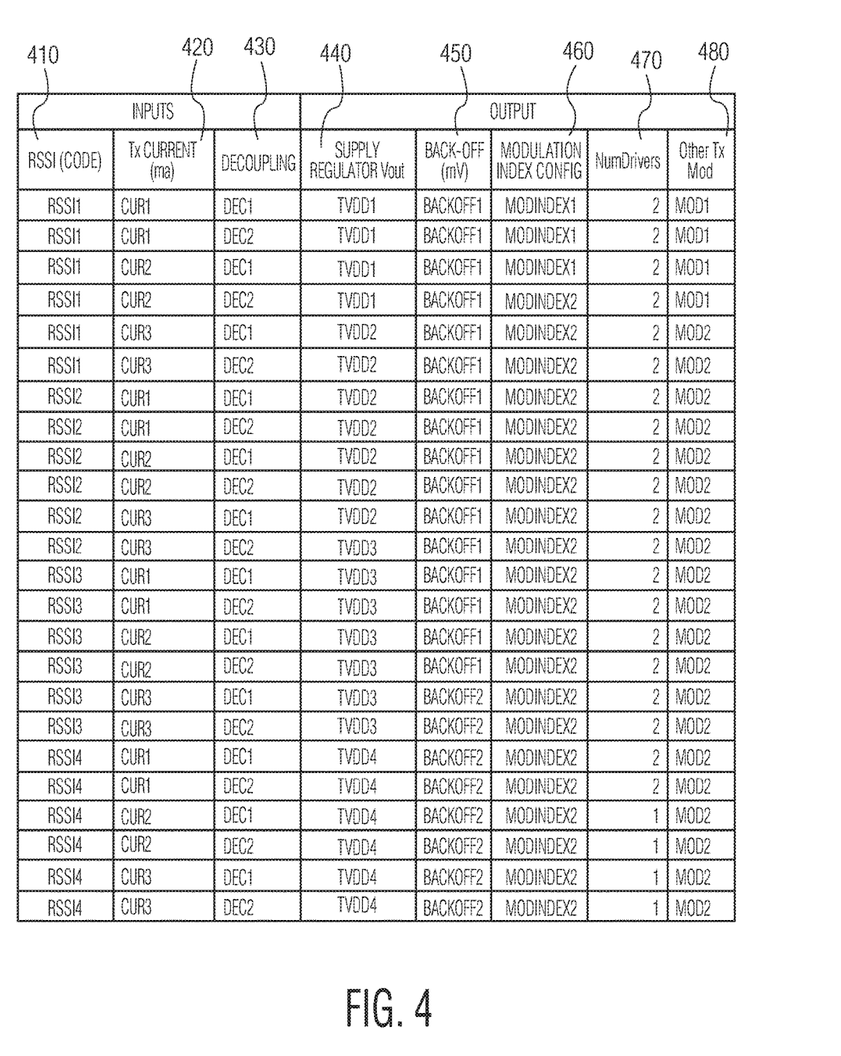
FIG. 4 illustrates another APC look up table that can be used by the APC unit depicted in FIG. 2.

In some embodiments, system parameters and corresponding APC configurations are stored in an APC look up table that can be used by the APC unit 208. FIGS. 3 and 4 illustrate two APC look up tables that can be used by the APC unit 208 depicted in FIG. 2. However, APC look up tables that can be used by the APC unit are not limited to the examples provided in the APC look up tables illustrated in FIGS. 3 and 4.

FIG. 3 illustrates an APC look up table having two input system parameters that can be used by the APC unit 208 depicted in FIG. 2. In the APC look up table illustrated in FIG. 3, the two input variables include the field strength, H, of inductive coupling, which is represented by a RSSI code 310, and a transmitter current value 320, which can be measured by a current sensor (not shown) that is included within the analog transmitter driver 118. In the APC look up table illustrated in FIG. 3, the output variables represent an APC configuration, which can include transmission configurations of the communications device such as supply regulator output voltage (supply regulator $V_{out}$) 340 (i.e., transmitter driver supply voltage), back-off voltage 350 (a ratio between a maximum possible transmit power and an actual mean transmit power of the communications device), modulation configuration 360 of the analog transmitter driver 118, the number of transmitter drivers 370 in the communications device, and other transmitter settings 380. In the APC look up table illustrated in FIG. 3, for entries in which the RSSI codes are identical to each other, the transmitter currents are different from each other. For example, the RSSI code when the communications device 102 is at a close distance (e.g., within 0.1 centimeter (cm)) from the counterpart communications device 104, may be identical to or similar to the RSSI code when the communications device 102 is at a farther distance (e.g., more than 3 cm) from the counterpart communications device 104. However, the transmitter current has a monotonic relationship with respect to the distance between the communications device 102 and the counterpart communications device 104. Consequently, using the RSSI code and the transmitter current, a desired APC configuration can be determined.

FIG. 4 illustrates an APC look up table having three input system parameters that can be used by the APC unit 208 depicted in FIG. 2. In the APC look up table illustrated in FIG. 4, the three input variables include the field strength, H, of inductive coupling, which is represented by a RSSI code 410, a transmitter current value 420, which can be measured by a current sensor (not shown) that is included within the analog transmitter driver 118, and a decoupling condition value 430 representing the decoupling condition between the communications device 102 and the counterpart communications device 104. In the APC look up table illustrated in FIG. 4, the output variables represent an APC configuration, which can include transmission configurations of the communications device such as supply regulator output voltage (supply regulator $V_{out}$) 440 (i.e., transmitter driver supply voltage), back-off voltage 450 (a ratio between a maximum possible transmit power and an actual mean transmit power of the communications device), modulation configuration 460 of the analog transmitter driver 118, the number of transmitter drivers 470 in the communications device, and other transmitter settings 480. In the APC look up table illustrated in FIG. 4, for entries in which the RSSI codes and the transmitter current are identical to each other, the decoupling condition values are different from each other. For example, a design or a configuration of the counterpart communications device (e.g., the dimension such as the size or the height, a design or a configuration of the antenna 132, or a design or a configuration of the RF transceiver 134) can affect the relationship between the transmitter current and a corresponding decoupling condition value. Consequently, using the RSSI code, the transmitter current, and the decoupling condition value, a desired APC configuration can be determined.

Figure 5:
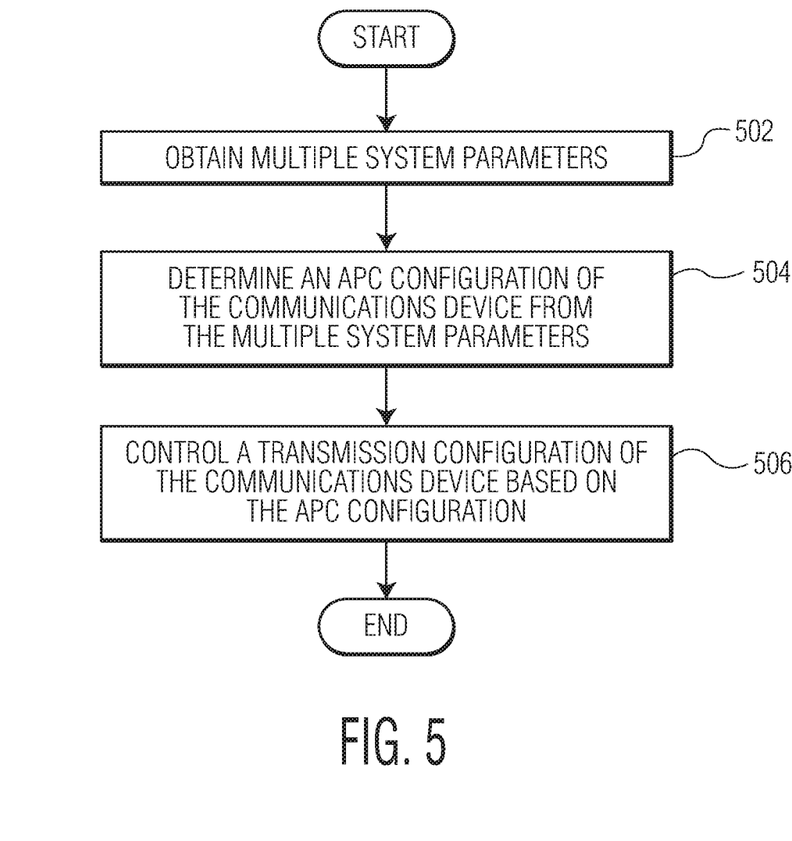
FIG. 5 is a process flow diagram of a method for APC in a communications device that communicates via inductive coupling in accordance with an embodiment of the invention.

FIG. 5 is a process flow diagram of a method for APC in a communications device that communicates via inductive coupling in accordance with an embodiment of the invention. At block 502, multiple system parameters are obtained. At block 504, an APC configuration of the communications device is determined from the multiple system parameters.

At block 506, a transmission configuration of the communications device is controlled based on the APC configuration. The communications device may be the same or similar to the communications device 102 depicted in FIG. 1.

Figure 6:
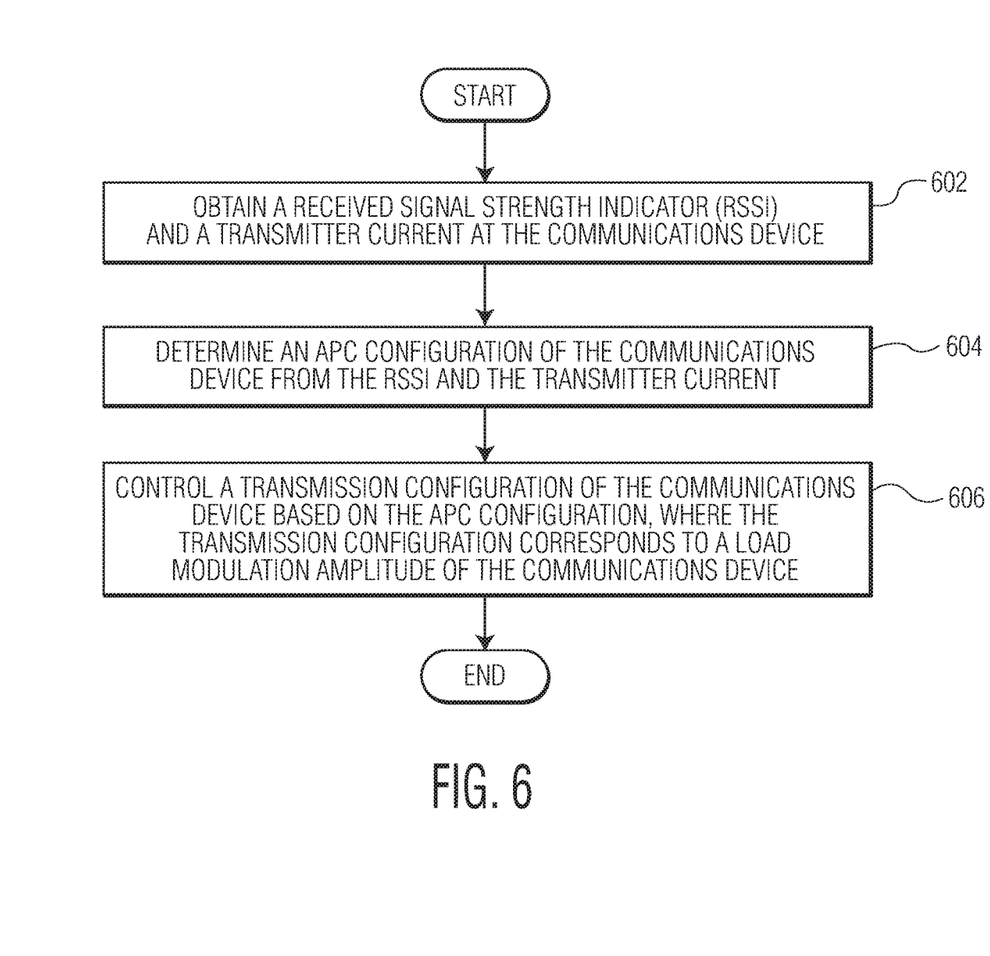
FIG. 6 is a process flow diagram of a method for APC in a communications device that communicates via inductive coupling in accordance with another embodiment of the invention.

FIG. 6 is a process flow diagram of a method for operating a communications device that communicates via inductive coupling in accordance with another embodiment of the invention. At block 602, a received signal strength indicator (RSSI) and a transmitter current are obtained at the communications device. At block 604, an APC configuration of the communications device is determined from the RSSI and the transmitter current. At block 606, a transmission configuration of the communications device is controlled based on the APC configuration, where the transmission configuration corresponds to a load modulation amplitude of the communications device. The communications device may be the same or similar to the communications device 102 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatic power control (APC) in a communications device that communicates via inductive coupling, the method comprising:
    obtaining a plurality of system parameters that include a particular system parameter having a monotonic relationship with respect to a distance between the communications device and a counterpart communications device;
    determining an APC configuration of the communications device from the plurality of system parameters, wherein determining the APC configuration of the communications device from the plurality of system parameters comprises using the system parameters as input variables, selecting a transmission configuration profile from a lookup table of profiles; and
    controlling a transmission configuration of the communications device based on the APC configuration.

2. The method of claim 1, wherein the plurality of system parameters comprise at least two of:
    a parameter indicating a field strength of inductive coupling;
    a parameter indicating a coupling condition or a decoupling condition of inductive coupling;
    a receiving characteristic of the communications device;
    a transmission characteristic of the communications device;
    an antenna characteristic of the communications device;
    a communications protocol configuration of the communications device;
    a retransmission configuration of the communications device;
    a phase configuration of the communications device; and
    a matching network characteristic of the communications device.

3. The method of claim 1, wherein the plurality of system parameters comprise a received signal strength indicator (RSSI) determined at the communications device.

4. The method of claim 1, wherein the plurality of system parameters comprise a transmitter current implemented at the communications device.

5. The method of claim 1, wherein the transmission configuration of the communications device comprises at least one of:
    information regarding a transmitter driver supply voltage of the communications device;
    information regarding modulation configuration of the communications device;
    information regarding a number of transmitter drivers in the communications device; and
    information regarding a ratio between a maximum possible transmit power and an actual mean transmit power of the communications device.

6. The method of claim 1, wherein determining the APC configuration of the communications device from the plurality of system parameters comprises:
    processing a first system parameter of the plurality of system parameters based on a second system parameter of the plurality of system parameters; and
    determining the APC configuration of the communications device from the processed first system parameter.

7. The method of claim 1, wherein determining the APC configuration of the communications device from the plurality of system parameters comprises determining the APC configuration of the communications device from the plurality of system parameters based on a look up table.

8. The method of claim 1, wherein the controlling the transmission configuration of the communications device comprises:
    configuring a supply regulator at the communications device to output a supply voltage from the selected transmission configuration profile.

9. An automatic power control (APC) unit for a communications device that communicates via inductive coupling, the APC unit comprising:

a system parameter obtaining unit configured to obtain a plurality of system parameters that include a particular system parameter having a monotonic relationship with respect to a distance between the communications device and a counterpart communications device;

an APC configuration determination unit configured to determine an APC configuration of the communications device from the plurality of system parameters, wherein the APC configuration determination unit is further configured to, using the plurality of system parameters as input variables, select a transmission configuration profile from a lookup table of profiles; and a transmission configuration control unit configured to control a transmission configuration of the communications device based on the APC configuration.

10. The APC unit of claim 9, wherein the plurality of system parameters comprise at least two of:
   a parameter indicating a field strength of inductive coupling;
   a parameter indicating a coupling condition or a decoupling condition of inductive coupling;
   a receiving characteristic of the communications device;
   a transmission characteristic of the communications device;
   an antenna characteristic of the communications device;
   a communications protocol configuration of the communications device;
   a retransmission configuration of the communications device;
   a phase configuration of the communications device; and
   a matching network characteristic of the communications device.

11. The APC unit of claim 10, wherein the parameter indicating the field strength of inductive coupling comprises a received signal strength indicator (RSSI) at the communications device.

12. The APC unit of claim 10, wherein the transmission characteristic of the communications device comprises a transmitter current at the communications device.

13. The APC unit of claim 9, wherein the transmission configuration of the communications device comprises at least one of:
   information regarding a transmitter driver supply voltage of the communications device;
   information regarding modulation configuration of the communications device;
   information regarding a number of transmitter drivers in the communications device; and
   information regarding a ratio between a maximum possible transmit power and an actual mean transmit power of the communications device.

14. The APC unit of claim 9, wherein the APC configuration determination unit is further configured to:
   process a first system parameter of the plurality of system parameters based on a second system parameter of the plurality of system parameters; and
   determine the APC configuration of the communications device from the processed first system parameter.

15. The APC unit of claim 14, wherein the first system parameter comprises a received signal strength indicator (RSSI) at the communications device.

16. The APC unit of claim 14, wherein the second system parameter comprises a transmitter current at the communications device.

17. The APC unit of claim 9, wherein the APC configuration determination unit is further configured to determine the APC configuration of the communications device from the plurality of system parameters based on a look up table.

18. A method for automatic power control (APC) in a communications device that communicates via inductive coupling, the method comprising:
   obtaining a received signal strength indicator (RSSI) determined at the communications device and a transmitter current measured at the communications device having a monotonic relationship with respect to a distance between the communications device and a counterpart communications device;
   determining an APC configuration of the communications device from the RSSI and the transmitter current, wherein determining the APC configuration of the communications device from the RSSI and the transmitter current comprises using the RSSI and the transmitter current as input variables, selecting a transmission configuration profile from a lookup table of profiles; and
   controlling a transmission configuration of the communications device based on the APC configuration, wherein the transmission configuration corresponds to a load modulation amplitude of the communications device.

19. The method of claim 18, wherein determining the APC configuration of the communications device from the RSSI and the transmitter current comprises:
   processing the RSSI based on the transmitter current; and
   determining the APC configuration of the communications device from the processed RSSI.

* * * * *